June 24, 1958  G. T. DRAKELEY  2,839,891
THRUST REVERSERS FOR JET ENGINES
Filed Nov. 27, 1953

INVENTOR.
GEORGE T. DRAKELEY
BY
Reynolds, Beach & Christensen
ATTORNEYS

June 24, 1958  G. T. DRAKELEY  2,839,891
THRUST REVERSERS FOR JET ENGINES
Filed Nov. 27, 1953  2 Sheets-Sheet 2

INVENTOR.
GEORGE T. DRAKELEY
BY
Reynolds, Beach + Christensen
ATTORNEYS

United States Patent Office 2,839,891
Patented June 24, 1958

2,839,891

THRUST REVERSERS FOR JET ENGINES

George T. Drakeley, Seattle, Wash., assignor to Boeing Airplane Company, Seattle, Wash., a corporation of Delaware Application November 27, 1953, Serial No. 394,728

7 Claims. (Cl. 60—35.54)

When a propeller driven aircraft lands, unless it be of a very simple and small type such as is not equipped with a reversible propeller, the pilot customarily reverses the pitch of its propeller blades as soon as is practicable after touchdown, and while the airplane is still rolling forwardly on the ground, with the object of halting its forward progress in a minimum distance, and without imposing severe stresses and wear on the brakes, tires and landing gear generally. With a jet airplane there has been heretofore no means to reverse the direction of thrust, with the result that jet aircraft require extremely long runways, not primarily for the purpose of taking off, but for the purpose of permitting them to come gradually to a stop under the control of the brakes primarily. When the runway is icy this requires a very long runway indeed, especially in comparison with the runway length required for stopping a similar airplane by reverse propeller thrust, under like conditions.

There have been attempts heretofore to reverse the thrust of a jet engine, for such a purpose, but generally these deflectors have had the effect only of lessening or deflecting the thrust, by directing the jet somewhat outwardly and rearwardly, whereby to lessen the forward thrust, but not forwardly to create a rearwardly directed or reverse thrust. Their effect, therefore, has been minor, and hardly commensurate with the additional complications and weight involved in their employment. By their bulk they have tended, also, to interrupt the smooth streamlined contour of the jet engine, or to enlarge its frontal area, or by their shape and disposition relative to the tailpipe to impede or adversely affect the free exit of the gases during normal flight, none of which is desirable in such high speed aircraft.

By the present invention there is provided mechanism which when not in use will be wholly housed in and will assist in maintaining the minimum smooth streamlined contour and proper exit shape of the jet engine, particularly externally thereof and at the rear end, but which when extended will serve ultimately to direct the thrust largely forwardly and to cut off all rearward thrust, so that the thrust effect of the jet engine may be employed in high degree in the reverse sense to slow down the forward progress of the airplane once it is rolling along the ground at landing. Such thrust reverser also acts independently of traction on wet or icy runways, to slow down the airplane, and so contributes materially to safety, and lessens the runway length required for jet operation.

According to this invention two flaps which constitute in normal flight a part of the longitudinally directed streamlined engine housing in the vicinity of and surrounding the tailpipe exit, and which are therefore curved to fit quite closely about the extremely hot tailpipe, with but little intervening space, are pivotally mounted to swing from this retracted position, rearwardly through approximately ninety degrees into a position wherein their rear edges are closely adjacent, and preferably about in the thrust axis, at a spacing to the rear of the tailpipe exit such as will not unduly impede the exit of the gases. In the latter extended or operative position the flaps are directed oppositely outwardly beyond the frontal projection of the rear end of the engine housing. By their disposition and curved shape they intercept, contain, and divert outwardly the issuing gases. Because of the necessary shape, in normal flight, of the rear edge of the housing or cowl, of which they are a part, and because of their 90° movement, in the usual design the extended flaps slope somewhat rearwardly, and it has been found impractical to effect more than outward diversion of the gases by these flaps alone without such alteration of their shape as to be aerodynamically undesirable. Accordingly, one of the distinctive features of this invention resides in the provision of a baffle at the interior surface of each flap, standing at such an angle to that flap surface when the flap is extended, and so located relative to the rear end of the engine housing, as again to intercept the outwardly directed gases which tend to follow the inner concave surface of the flap, and to deflect the outwardly diverted gases again in a truly forward sense, outside the engine housing. These baffles might be fixed immovably relative to and in contact with the inner surface of the respective flaps, but since they must be of sufficient area and at a sufficient angle to the diverted gases to effectively deflect the same forwardly, and since the spacing between the retracted flap and the tailpipe which it surrounds during flight is desirably quite small, too small for storage of an effective baffle, the baffles are preferably so mounted on their respective flaps, for example, by a pivotal mounting, that when the flap is retracted its baffle lies substantially flat against the inner surface of the flap, and as far away from the hot tailpipe as is practicable within the restricted space, whereas when the flap is extended its baffle is swung into the relative angled position necessary for effective results, such as can only be obtained by approximately 90° additional deflection by such baffles. Mechanism so to swing the baffle during swinging of the flap is coordinated with the flap-swinging mechanism.

The general object of the invention is as outlined above. More specifically, it is an object of the invention to provide a thrust reverser of the character indicated which shall be simple in construction and in operation, and in which supplemental baffle means that when retracted fit into the curved and extremely small or thin space intermediate the tailpipe and the surrounding cowl, which is the only space available, will extend as required and will be effective, when extended, to interpose adequate areas in the required directions to effect reversal of the jet thrust.

With these and other objects in mind, as will become more apparent as this specification progresses, the present invention comprises the novel jet thrust reversing mechanism shown in the accompanying drawings in a typical form, and the principles whereof will be more fully explained hereinafter and defined in the appended claims.

Figure 1:
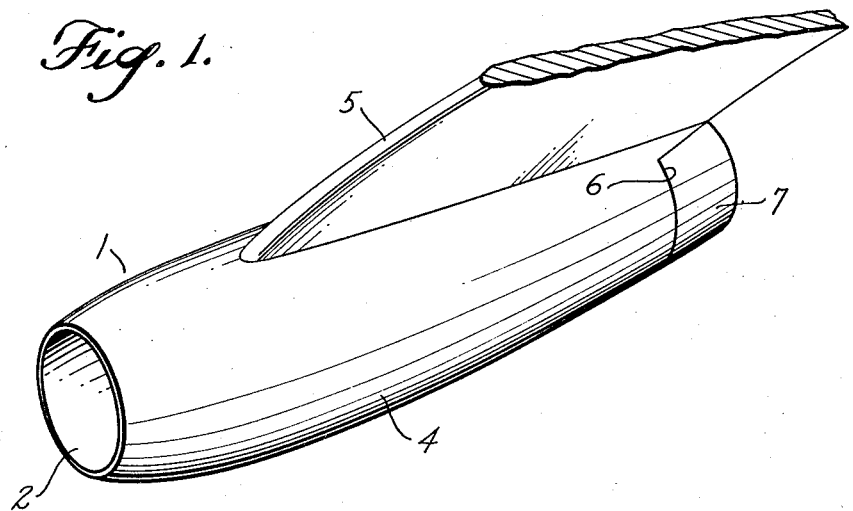
Figure 1 is a perspective view of a typical jet engine pod, being an approximately three-quarters forward and side view combined, from slightly above, showing the thrust reversing mechanism fully retracted.
Figure 2:
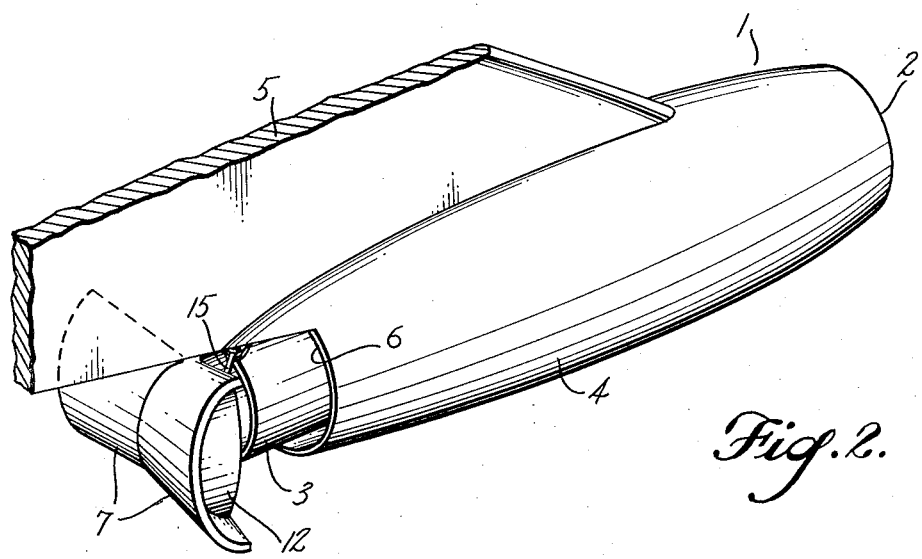
Figure 2 is a similar view but from three-quarters to the rear, and showing the thrust reversing mechanism fully extended.
Figure 3:
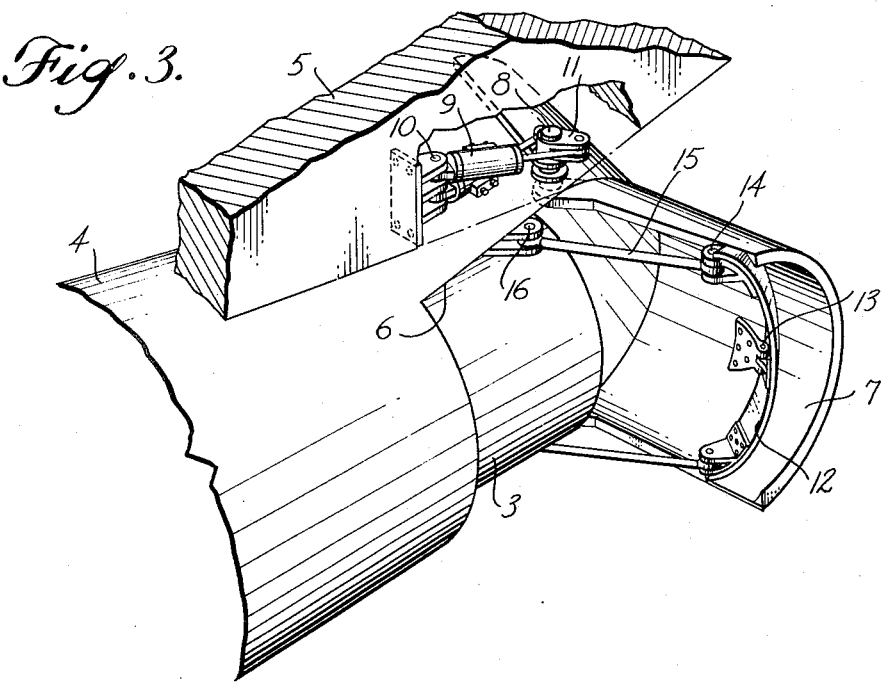
Figure 3 is an enlarged perspective view, also from three-quarters forward and from above, showing only the rear end of the jet engine and the thrust reversing mechanism, fully extended.

The invention consists primarily of two flaps mounted at the tail end of the jet engine housing in such manner that they may swing from a retracted position, wherein they form part of the longitudinally directed streamlined housing, rearwardly into edge-adjoining position behind the tailpipe exit, and directed outwardly at both sides of the thrust axis. In this latter extended position they are disposed generally transverse to the engine's axis, to intercept and contain the issuing gases and direct them outwardly towards the sides. Baffles carried by and standing at an angle to the interior surface of the respective extended flaps intercept the outwardly diverted gases as the latter tend to follow the flaps' inside surfaces, and further deflect such gases and direct them forwardly. These baffles, since they must be stored in the narrow space between the retracted flaps and the tailpipe, yet must stand out from the surface of the extended flaps to deflect the outwardly directed gases forwardly, will not ordinarily have room so that they can be fixedly mounted upon the flaps, but will instead be hingedly or otherwise shiftably mounted upon their respective flaps for movement between their deflecting position and a collapsed position, wherein they lie nearly coincident with the curvature of the flap's surface. Mechanism to accomplish such shifting of the flaps is coordinated with the mechanism that swings the flaps themselves. Jet reversing mechanism of this general type has been termed a "clamshell" reverser, and with the addition of the baffles that characterize this invention has proven very satisfactory in use.

The jet engine pod 1 is generally of streamlined shape, provided with an air scoop or intake at its forward end 2, and terminating in its rear end in a generally cylindrical tailpipe 3, the entire engine being housed within a cowl or housing 4 which converges inwardly toward the tailpipe 3 at the rear end. The whole is shown as supported by a strut 5 by which in one well known design it is suspended beneath a wing or similar structure. The extreme rear end of the housing is cut so as to have the two originally rearmost edges of the flaps meet and match when the flaps are swung outwardly, to eliminate any appreciable escape port opening rearwardly, and for improved mutual stability of the two flaps.

Figure 4:
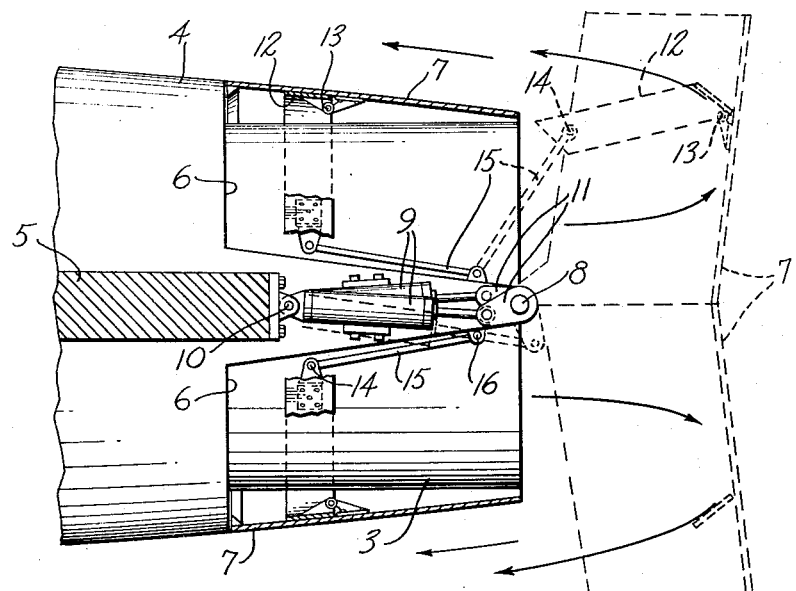
Figure 4 is in general a top plan view but with parts in section, illustrating in full lines the thrust reversing mechanism fully retracted, and in dash lines the same mechanism fully extended.

In this particular design the cowl at its extreme rear end, where it converges toward the rear end of the tailpipe 3, is notched as indicated at 6, there being two notches each of large angular extent, for example approximating 180°, extending forwardly for a distance from the rear end of the cowl 4. Each such notch is filled in smoothly by a deflector flap 7, which is of a shape to precisely fill its notch and to complete the streamlined contour of the extreme rear end of the cowl. These two flaps 7 are so mounted that they can swing rearwardly and outwardly until their rear edges meet, being, for example, mounted upon a common pivot means indicated at 8, which has its axis disposed in a substantially diametral line at the rear end of the tailpipe and cowl. This can best be seen in Figure 4. So supported, the two deflector flaps 7 may swing from their retracted notch-closing position, shown in full lines in Figure 4, through approximately ninety degrees to an outwardly swung deflecting position, shown in dash lines in the same figure, wherein their rear edges abut. Such abutment is necessary to cut off all rearwardly directed thrust, and to direct the thrust first outwardly. Mechanism such as the hydraulic jacks 9 may be provided, connected between a fixed point 10 on the cowl and short levers 11 on the respective flaps, to effect and control movement of the flaps between the two positions under control of the pilot.

In order that the rear edges of the deflector flaps when outwardly swung may meet and match along their entire length, and so leave no rearwardly opening gap, each rear edge must be cut along a plane surface, but the plane surface defined by the edge of one flap does not, when the flaps are retracted, necessarily coincide with the plane surface defined by the other flap's edge; the two may converge rearwardly to a blunt point in the vicinity of the hinge axis at 8. The relative angularity, if any, of the two flaps' rear edges, and the location of the hinge axis, are governed by their effect on the normal operating efficiency of the engine, which must be the primary design consideration.

The present invention does not rely on the flaps 7 to effect thrust reversal, for they alone will not do this. Rather, in addition to the flaps 7, there are provided baffles on the interior surface of the flaps, so directed when the flaps are fully extended that the exhaust gases which by the extended flaps are contained and directed outwardly, are by the baffles reversed and directed forwardly. Because the flaps are directed primarily outwardly, and even slightly rearwardly, when fully extended, it is evident that such baffles must be disposed at a steep angle to the flap in order to effect as much reversal as is possible—as much as 90° deflection of the outwardly directed gas—of the direction of the exhaust gases and of the thrust. However, there is but little space between the rear end of the cylindrical tailpipe 3 and the rearwardly convergent cowl 4, nor, hence, between the flaps 7 which when retracted constitute a continuation of the interrupted cowl, and the tailpipe. This space would be inadequate for baffles of sufficient area fixedly positioned on the interior of the flaps at the requisite steep angle and at the correct location. Accordingly, the baffles 12 are so mounted on the respective flaps 7 that, when retracted each such baffle, being a substantially semi-cylindrical band, lies closely against the interior of its flap, as shown in full lines in Figure 4, and so will not interfere with nor lie closer than necessary to the tailpipe, but when its flap is swung outwardly the baffle will swing with and also relative to the flap, into a fully extended position, shown in dash lines in Figure 4, wherein it is disposed at a steep, thrust-reversing angle to the flap.

To this end the baffles 12 are pivotally mounted at 13 upon the interior surface of the respective flaps and at a point midway between the ends of the baffles, where, when parts are extended, the baffles will direct the gases outwardly beyond the exterior of the cowl 4. The pivot axis at 13 is parallel to the pivot axis at 8. To effect movement of these baffles they are connected at their outer ends, as indicated at 14, and at some leverage from the pivot at 13, to tension members or links 15, which at their opposite ends are fixedly pivoted at 16, as for example upon the cowl or any other suitable support.

Now, when the flaps are swung outwardly into their intercepting, containing, and deflecting position, the action of the links 15, working from the fixed pivots at 16 offset from the pivot axis at 8, causes the baffles to swing outwardly on their pivots at 13, and away from the inner surface of the flap against which they formerly lay substantially flat. Each baffle may have sufficient flexibility to contract slightly at its ends to conform to the curvature of the flap in this new position, and to lie tightly against the flap at all points in its contacting edge. In this outwardly swung position the baffles 12 are at an appreciable angle of inclination to and are directed forwardly and outwardly from the flaps, with the result as shown by the arrows in Figure 4, that the rearwardly directed thrust from the tailpipe, contained within and deflected first outwardly by the flaps 7, is again deflected, this time forwardly, by the baffles 12. There is an approximation to a direct reversal of the thrust, and this acts positively to terminate the forward movement of the airplane.

I claim as my invention:

1. In combination with the tailpipe of a jet engine, deflector flaps mounted for movement between an inoperative position alongside the tailpipe and an operative position wherein they are disposed to the rear of and directed outwardly of the axis of said tailpipe, said deflector flaps being of a shape that, in their inoperative position, they partially encircle the tailpipe, and in their operative position they intercept, contain, and deflect outwardly gases discharging from the tailpipe, means to shift said flaps between such two positions, a baffle located intermediate each flap and the tailpipe, and when the flap is in its inoperative position embracing a material angular portion of the periphery of the tailpipe, pivot means directed generally chordally of the tailpipe, supporting each of said baffles, intermediate its ends, from the interior surface of the corresponding flap, and links connecting the ends of each baffle with a point fixed relative to the tailpipe, to swing the baffle into a position inclined outwardly and forwardly from the flap as the flap moves to its operative position, to intercept, contain, and direct forwardly the originally outwardly directed gases as they follow the interior surface of the flap.

2. In combination with the tailpipe of a jet engine, a surrounding cowl converging rearwardly towards the tailpipe's rear end, and notched for a distance forwardly of its rear end at each side of a generally diametral line transverse to and located at its rear end, two deflector flaps each curved transversely and shaped to close its respective notch when inwardly swung, and to complete the streamline contour of the cowl's rear end, pivot means the axis whereof substantially coincides with such diametral line, mounting said flaps for swinging outwardly and to the rear of the tailpipe's rear end, from such inwardly swung notch-closing position into an outwardly swung position behind the tailpipe where they intercept, contain, and deflect outwardly discharging exhaust gases, means to swing said flaps between such two positions, a baffle located intermediate each flap and the tailpipe, and when the flap is in its inwardly swung position embracing a material angular portion of the periphery of the tailpipe, pivot means paralleling the flaps' pivot axis, and supporting each of said baffles, intermediate its ends, from the interior surface of the corresponding deflector flap, and links connecting the ends of each baffle and the cowl, at a point on the latter offset from the flaps' pivot axis, to swing the baffle into a position inclined outwardly and forwardly from the flap as the flap swings outwardly to its deflecting position, to intercept, contain, and direct the originally outwardly deflected gases now forwardly.

3. The combination defined in claim 2, wherein the rear ends of the flaps are complementally shaped to interengage when they are outwardly swung into their deflecting position.

4. The combination defined in claim 2, wherein the links are of fixed length, and extend from a pivotal connection at the end of a baffle to a pivotal connection located outwardly and ahead of the flaps' common pivotal mounting axis.

5. In combination with the tailpipe of a jet engine, a surrounding cowl including a fixed portion and a plurality of movable portions spaced about the rear end of the tailpipe, means mounting said movable portions for movement from a normal retracted position, wherein they are directed generally longitudinally, and closely surround the tailpipe, to a projected position wherein they lie transverse to and outstanding from the engine's longitudinal axis, and to the rear of the tailpipe, to deflect initially outwardly the gases issuing thence, deflector elements mounted in contact with the interior surface of each such movable portion, said deflector elements, when the movable portions are in their projected positions, being inclined outwardly and forwardly from the wall of the respective movable portions, to deflect forwardly the outwardly directed gases which were initially so deflected by said movable portions, and means reacting from the tailpipe to move the movable portions between their retracted and projected positions.

6. The combination of claim 5, wherein the means to move the deflector elements includes linkage between said deflector elements and the engine, arranged to shift the deflector elements into their outwardly inclined positions automatically by movement of the movable portions into their projected positions.

7. The combination of claim 5, including pivot means to mount each deflector element upon its movable portion, for movement between a retracted position in close proximity to the interior surface of the movable portion, and its deflecting position, wherein it is in edge contact therewith and inclined with respect to the gas flow thereover, and means reacting from the tailpipe and connected to said deflectors for moving them from their retracted position as the movable portions move from their retracted position, and vice versa.

References Cited in the file of this patent

UNITED STATES PATENTS 2,620,622    Lundberg _____ Dec. 9, 1952

FOREIGN PATENTS 613,989    Great Britain _____ Dec. 8, 1948

OTHER REFERENCES

"Aircraft Engineering," February 1946, page 55.